US011039004B1

(12) United States Patent
Ma et al.

(10) Patent No.: US 11,039,004 B1
(45) Date of Patent: Jun. 15, 2021

(54) METHOD AND APPARATUS FOR AUTOMATICALLY SETTING ALARMS AND NOTIFICATIONS

(71) Applicant: Apple Inc., Cupertino, CA (US)

(72) Inventors: Shannon M. Ma, San Francisco, CA (US); Devrim Varoglu, Santa Clara, CA (US); Mohammad Bidabadi, San Francisco, CA (US); Paolo D. Concha, Chula Vista, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/860,966

(22) Filed: Apr. 28, 2020

Related U.S. Application Data

(63) Continuation of application No. 16/597,580, filed on Oct. 9, 2019, now Pat. No. 10,742,797, which is a
(Continued)

(51) Int. Cl.
*G08B 23/00* (2006.01)
*H04M 1/72454* (2021.01)
(Continued)

(52) U.S. Cl.
CPC ...... *H04M 1/72454* (2021.01); *G04G 13/023* (2013.01); *G04G 13/026* (2013.01);
(Continued)

(58) Field of Classification Search
None
See application file for complete search history.

(56) References Cited

U.S. PATENT DOCUMENTS

| 6,477,117 B1 | 11/2002 | Narayanaswami et al. |
| 6,605,038 B1 | 8/2003 | Teller et al. |

(Continued)

FOREIGN PATENT DOCUMENTS

| BA | 0621091540 B | 1/2018 |
| CN | 1889045 A | 1/2007 |

(Continued)

OTHER PUBLICATIONS

"DPAC Dynamically Programmable Alarm Clock", Web Post and Video Demonstration based on an EE Capstone Competition Design Project presented at Northeastern University, Apr. 8, 2010, 15 pages.
(Continued)

*Primary Examiner* — Gary Lafontant
(74) *Attorney, Agent, or Firm* — Kilpatrick Townsend & Stockton LLP

(57) ABSTRACT

A processor-based personal electronic device (such as a smartphone) is programmed to automatically respond to data sent by various sensors from which the user's activity may be inferred. One or more alarms on the device may be temporarily disabled when sensor data indicates that the user is asleep. One or more of the sensors may be worn by the user and remote from the device. A wireless communication link may be used by the device to obtain remote sensor data. Data from on-board sensors in the device—such as motion sensors, location sensors, ambient light sensors, and the like—may also be used to deduce the user's current activity. User data (such as calendar entries) may also be used to determine likely user activity and set alarms accordingly. Biometric data from a second, nearby person may also be used to automatically select certain alarm modes on a first person's device.

21 Claims, 2 Drawing Sheets

Related U.S. Application Data continuation of application No. 13/714,753, filed on Dec. 14, 2012, now Pat. No. 10,447,844.

(51) Int. Cl.
| | | |
|---|---|---|
| *G04G 21/02* | (2010.01) | |
| *G04G 13/02* | (2006.01) | |
| *G04G 21/04* | (2013.01) | |
| *H04M 1/72451* | (2021.01) | |

(52) U.S. Cl.
CPC ............ *G04G 21/025* (2013.01); *G04G 21/04* (2013.01); *H04M 1/72451* (2021.01); *H04M 2250/12* (2013.01)

(56) References Cited

U.S. PATENT DOCUMENTS

| | | |
|---|---|---|
| 7,130,664 B1 | 10/2006 | Williams |
| 7,221,331 B2 | 5/2007 | Bear et al. |
| 7,715,873 B1 | 5/2010 | Biere et al. |
| 8,223,918 B2 | 7/2012 | Roin et al. |
| 8,233,918 B2 | 7/2012 | Roin et al. |
| 8,299,902 B1 | 10/2012 | Roka |
| 8,306,514 B1 | 11/2012 | Nunally |
| 8,350,681 B2 | 1/2013 | Bells |
| 8,483,665 B2 | 7/2013 | Kissinger et al. |
| 8,548,431 B2 | 10/2013 | Teng et al. |
| 8,614,431 B2 | 12/2013 | Huppi et al. |
| 9,049,572 B2 | 6/2015 | Kissinger et al. |
| 9,210,566 B2 | 12/2015 | Ziemianska et al. |
| 9,641,669 B2 | 5/2017 | Ziemianska et al. |
| 9,668,657 B2 | 6/2017 | Takahashi |
| 10,447,844 B2 | 10/2019 | Ma et al. |
| 2002/0004672 A1 | 1/2002 | Florio et al. |
| 2003/0139138 A1 | 7/2003 | Cho et al. |
| 2004/0145493 A1 | 7/2004 | O'Connor et al. |
| 2005/0154935 A1* | 7/2005 | Jin .......................... G06F 21/88 713/324 |
| 2005/0172311 A1 | 8/2005 | Hjelt et al. |
| 2007/0043687 A1 | 2/2007 | Bodart et al. |
| 2008/0165022 A1 | 7/2008 | Herz et al. |
| 2008/0287134 A1* | 11/2008 | Catovic ................. H04W 68/02 455/445 |
| 2008/0319279 A1 | 12/2008 | Ramsay et al. |
| 2009/0156172 A1 | 6/2009 | Chan |
| 2009/0182560 A1 | 7/2009 | White |
| 2009/0186633 A1 | 7/2009 | Yonker et al. |
| 2010/0052930 A1* | 3/2010 | Grigsby ............ H04W 52/0258 340/663 |
| 2011/0183650 A1 | 7/2011 | McKee |
| 2011/0267196 A1* | 11/2011 | Hu .......................... A61B 5/681 340/575 |
| 2012/0084248 A1 | 4/2012 | Gavrilescu |
| 2012/0158943 A1 | 6/2012 | Esteve Balducci et al. |
| 2012/0229276 A1 | 9/2012 | Ronkainen |
| 2012/0323933 A1 | 12/2012 | He et al. |
| 2013/0316744 A1 | 11/2013 | Newham et al. |
| 2013/0324196 A1 | 12/2013 | Wang et al. |
| 2014/0058679 A1 | 2/2014 | Varoglu et al. |
| 2014/0085077 A1 | 3/2014 | Luna et al. |
| 2014/0101611 A1 | 4/2014 | Lang et al. |
| 2014/0101644 A1 | 4/2014 | Buzaski et al. |
| 2014/0171132 A1 | 6/2014 | Ziemianska et al. |
| 2014/0171146 A1 | 6/2014 | Ma et al. |
| 2014/0172873 A1 | 6/2014 | Varoglu et al. |
| 2014/0206327 A1 | 7/2014 | Ziemianska et al. |
| 2016/0036996 A1 | 2/2016 | Midholt et al. |
| 2016/0066124 A1 | 3/2016 | Chang et al. |
| 2016/0163181 A1 | 6/2016 | Levy et al. |
| 2016/0182710 A1 | 6/2016 | Flamini et al. |
| 2016/0241706 A1 | 8/2016 | Ziemianska et al. |
| 2016/0321616 A1 | 11/2016 | Gedge et al. |
| 2017/0038741 A1 | 2/2017 | Watanabe |

FOREIGN PATENT DOCUMENTS

| | | |
|---|---|---|
| CN | 101394787 A | 3/2009 |
| CN | 101471978 A | 7/2009 |
| CN | 202057981 U | 11/2011 |
| CN | 102804238 A | 11/2012 |
| CN | 104937520 | 9/2015 |
| EP | 2747392 A1 | 6/2014 |
| EP | 2941679 A1 | 11/2015 |
| GB | 2434720 A | 8/2007 |
| HK | 1214010 | 7/2016 |
| JP | 2009232925 A | 10/2009 |
| TW | 200642421 A | 12/2006 |
| TW | 201622438 | 5/2016 |
| TW | 0193191897 B | 1/2018 |
| TW | I615048 | 2/2018 |
| WO | 2012021507 A2 | 2/2012 |
| WO | 2014113248 A1 | 7/2014 |
| WO | 2016036505 A1 | 3/2016 |

OTHER PUBLICATIONS

"Walk Me Up! Alarm Clock", Bazzinga Labs Productivity, Available Online at: https://play.google.com/store/apps/details?id=com.moosa.alarmclock&hl=en, Accesed from Internet on May 7, 2019, 3 pages.

U.S. Appl. No. 13/714,753, "Advisory Action", dated Mar. 6, 2015, 3 pages.

U.S. Appl. No. 13/714,753, "Final Office Action", dated Dec. 22, 2014, 22 pages.

U.S. Appl. No. 13/714,753, "Final Office Action", dated Sep. 3, 2015, 37 pages.

U.S. Appl. No. 13/714,753, "Non-Final Office Action", dated Apr. 27, 2015, 35 pages.

U.S. Appl. No. 13/714,753, "Non-Final Office Action", dated Mar. 27, 2014, 22 pages.

U.S. Appl. No. 13/714,753, "Non-Final Office Action", dated Sep. 26, 2014, 31 pages.

U.S. Appl. No. 13/714,753, "Notice of Allowability", dated Aug. 14, 2019, 3 pages.

U.S. Appl. No. 13/714,753, "Notice of Allowance", dated Feb. 13, 2019, 8 pages.

U.S. Appl. No. 13/714,753, "Notice of Allowance", dated Jun. 5, 2019, 7 pages.

U.S. Appl. No. 13/715,096, "Advisory Action", dated Dec. 31, 2015, 3 pages.

U.S. Appl. No. 13/715,096, "Final Office Action", dated Sep. 9, 2015, 10 pages.

U.S. Appl. No. 13/715,096, "Non-Final Office Action", dated Jan. 27, 2015, 11 pages.

U.S. Appl. No. 13/715,096, "Restriction Requirement", dated Jul. 30, 2014, 6 pages.

U.S. Appl. No. 13/744,547, "Final Office Action", dated Apr. 1, 2015, 9 pages.

U.S. Appl. No. 13/744,547, "Non-Final Office Action", dated May 28, 2014, 9 pages.

U.S. Appl. No. 13/744,547, "Notice of Allowance", dated Aug. 11, 2015, 5 pages.

U.S. Appl. No. 14/475,445, "Final Office Action", dated Oct. 12, 2016, 11 pages.

U.S. Appl. No. 14/475,445, "Non-Final Office Action", dated Aug. 4, 2017, 15 pages.

U.S. Appl. No. 14/475,445, "Non-Final Office Action", dated Feb. 21, 2017, 13 pages.

U.S. Appl. No. 14/475,445, "Non-Final Office Action", dated Jun. 2, 2016, 9 pages.

U.S. Appl. No. 14/475,445, "Restriction Requirement", dated Jan. 22, 2016, 6 pages.

U.S. Appl. No. 14/992,897, "Final Office Action", dated Nov. 17, 2016, 15 pages.

U.S. Appl. No. 14/992,897, "Non-Final Office Action", dated Jul. 28, 2016, 12 pages.

(56) References Cited

OTHER PUBLICATIONS

U.S. Appl. No. 14/992,897, "Notice of Allowance", dated Mar. 1, 2017, 7 pages.
U.S. Appl. No. 16/380,122, "Non-Final Office Action", dated Dec. 30, 2019, 6 pages.
U.S. Appl. No. 16/597,580, "Notice of Allowability", dated Apr. 20, 2020, 3 pages.
U.S. Appl. No. 16/597,580, "Notice of Allowability", dated Mar. 24, 2020, 3 pages.
U.S. Appl. No 16/597,580, "Notice of Allowance", dated Feb. 20, 2020, 10 pages.
Canella, "Wake N Shake Alarm Clock", The App Store, Available Online at: https://play.google.com/store/apps/details?id=com.moosa.alarmclock&hl=en, Accessed from Internet on May 7, 2019, 3 pages.
CN201480005135.5, "Office Action", dated Jan. 12, 2017, 23 pages.
CN201480005135.5, "Office Action", dated Oct. 10, 2017, 11 pages.
Costello, "Using Do Not Disturb on iPhone", Availabale Online at, https://web.archive.org/web/20130116134725/http://ipod.about.com/od/phonefeatures/a/Using-Do-Not-Disturb-On-Iphone.htm, Jun. 15, 2012, 1 page.
EP14701859.2, "Office Action", dated Nov. 15, 2017, 4 pages.
Lex, et al., "Alarm Failsafe: Wake Me Up if I Fall Back Asleep", Google Groups, Available Online at: https://groups.google.com/forum/#!msg/tasker/j7s032C_Ptc/01 HQDB3_kRoJ_on, Accessed from Internet on May 7, 2019, 1 page.
PCT/US2014/010637, "International Preliminary Report on Patentability", dated Jul. 30, 2015, 7 pages.
PCT/US2014/010637, "International Search Report and Written Opinion", dated Mar. 25, 2014, 9 pages.
PCT/US2015/045743, "International Preliminary Report on Patentability", dated Mar. 16, 2017, 7 pages.
PCT/US2015/045743, "International Search Report and written opinion", dated Oct. 29, 2015, 9 pages.
Pina, et al., "Fitbit+: A Behavior-Based Intervention System to Reduce Sedentary Behavior", CHI 2012, May 7-12, 2012, 4 pages.
TW104128529, "Notice of Decision to Grant", dated Oct. 26, 2017, 3 pages.
TW104128529, "Office Action", dated Feb. 16, 2017, 10 pages.
TW104128529, "Office Action", dated Jul. 11, 2016, 10 pages.

* cited by examiner

METHOD AND APPARATUS FOR AUTOMATICALLY SETTING ALARMS AND NOTIFICATIONS

CROSS-REFERENCES TO RELATED APPLICATIONS

This application is a continuation of U.S. patent application Ser. No. 16/597,580 entitled, "METHOD AND APPARATUS FOR AUTOMATICALLY SETTING ALARMS AND NOTIFICATIONS," filed Oct. 9, 2019, which is a continuation of U.S. patent application Ser. No. 13/714,753 (now U.S. Pat. No. 10,447,844) entitled, "METHOD AND APPARATUS FOR AUTOMATICALLY SETTING ALARMS AND NOTIFICATIONS" filed Dec. 14, 2012 and are hereby incorporated by reference in their entirety for all purposes.

BACKGROUND OF THE INVENTION

This invention relates to personal electronic devices. More particularly, it relates to the alarm and notification functions of smartphones.

A smartphone is a mobile phone built on a mobile operating system and having advanced computing capability and connectivity. The first smartphones combined the functions of a personal digital assistant (PDA) with a mobile phone. Later models added the functionality of portable media players, compact digital cameras, pocket video cameras, and GPS navigation units to form one multi-use device. Many current smartphones also include high-resolution touchscreens for input and web browsers that display standard web pages as well as mobile-optimized sites. High-speed data access may be provided by Wi-Fi and/or Mobile Broadband.

Wi-Fi is a widely-used technology that allows an electronic device to exchange data wirelessly (using radio waves) over a computer network, including high-speed Internet connections. The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or "hotspot") typically has a range of about 65 feet (20 meters) indoors and a greater range outdoors. Hotspot coverage can comprise an area as small as a single room with walls that block radio waves or as large as many square miles—this may be achieved by using multiple overlapping access points.

Mobile broadband is the term used for wireless Internet access through a portable modem, mobile phone, USB wireless modem, or other mobile devices.

A smartphone is basically a cellular telephone with built-in applications and Internet access. In addition to digital voice service, current smartphones provide text messaging, e-mail, Web browsing, and video playback and calling. In addition to their built-in functions, smartphones can run myriad free and paid applications, turning the cellphone into a mobile personal computer.

In addition to radio transmitters and receivers for interacting with cellular telecommunications systems, many smartphones have additional sensors that provide input to their various systems. For example, Apple Inc.'s iPhone® 5 smartphone includes at three-axis gyro, an accelerometer, a proximity sensor and an ambient light sensor.

The iPhone display may respond to a number of sensors. A proximity sensor deactivates the display and touchscreen when the device is brought near the face during a call. This is done to save battery power and to prevent inadvertent inputs from contact with the user's face and ears. An ambient light sensor adjusts the display brightness which in turn saves battery power. A 3-axis accelerometer senses the orientation of the phone and changes the screen accordingly, allowing the user to easily switch between portrait and landscape mode. Photo browsing, web browsing, and music playing support both upright and left or right widescreen orientations.

Certain smartphones have a "do not disturb" mode. When the "do not disturb" mode is activated (e.g., via a Settings menu), the phone suppresses most forms of communication—phone calls, text messages, alarms, social media notifications, and the like. When this mode is enabled, the phone will not light up or vibrate at all, so the user can get through a meeting or go to bed without being disturbed by the outside world. However, all of those notifications may get captured and appear in a "Notification Center" when the phone's display is turned on by the user.

The user may configure the "Do not disturb" feature to function on a predefined schedule, or may simply turn it on and off as needed. The user may also specify certain contacts—sometime designated as "VIPs"—who are allowed to get through to the user even if the phone is in "do not disturb" mode.

In certain implementations, when a call comes in, the user can choose to answer or ignore it, as usual, or may immediately reply with a text message. The user may also set the smartphone to remind him or her about the call later—either at a specific time, or when leaving the current location (as determined from the phone's location sensors).

Various options may allow the Do Not Disturb settings on a smartphone to be further customized. For example, an option for "Repeated Calls" may allow activation of a mode wherein whenever someone calls back a second time from the same number within a certain time interval, the second call will not be silenced.

BRIEF SUMMARY OF THE INVENTION

A processor-based personal electronic device (such as a smartphone) is programmed to automatically respond to data sent by various sensors from which the user's activity may be inferred. For example, one or more alarms on the device may be temporarily disabled when sensor data indicates that the user is asleep. One or more of the sensors may be worn by the user and remote from the device. A wireless communication link may be used by the device to obtain remote sensor data. In certain embodiments, data from on-board sensors in the device—such as motion sensors, location sensors, ambient light sensors, and the like—may also be used to deduce the user's current activity. In yet other embodiments, user data (such as calendar entries) may also be used to determine likely user activity and set alarms accordingly.

In one particular representative embodiment, the invention comprises a process for determining whether the user has fallen asleep and a wake-up alarm is automatically set to activate after a pre-defined sleep duration. The process may further include automatically disabling other alarms and/or notifications during the sleep period.

In another particular preferred embodiment, the process may receive data from another device to determine whether a second person is sleeping nearby—e.g., a bedmate. If so, the process may automatically disable any audible alarms on a first person's device and activate a remote, tactile alarm worn by the first person—e.g., a bracelet containing a built-in vibrator.

DETAILED DESCRIPTION OF THE INVENTION

Figure 1:
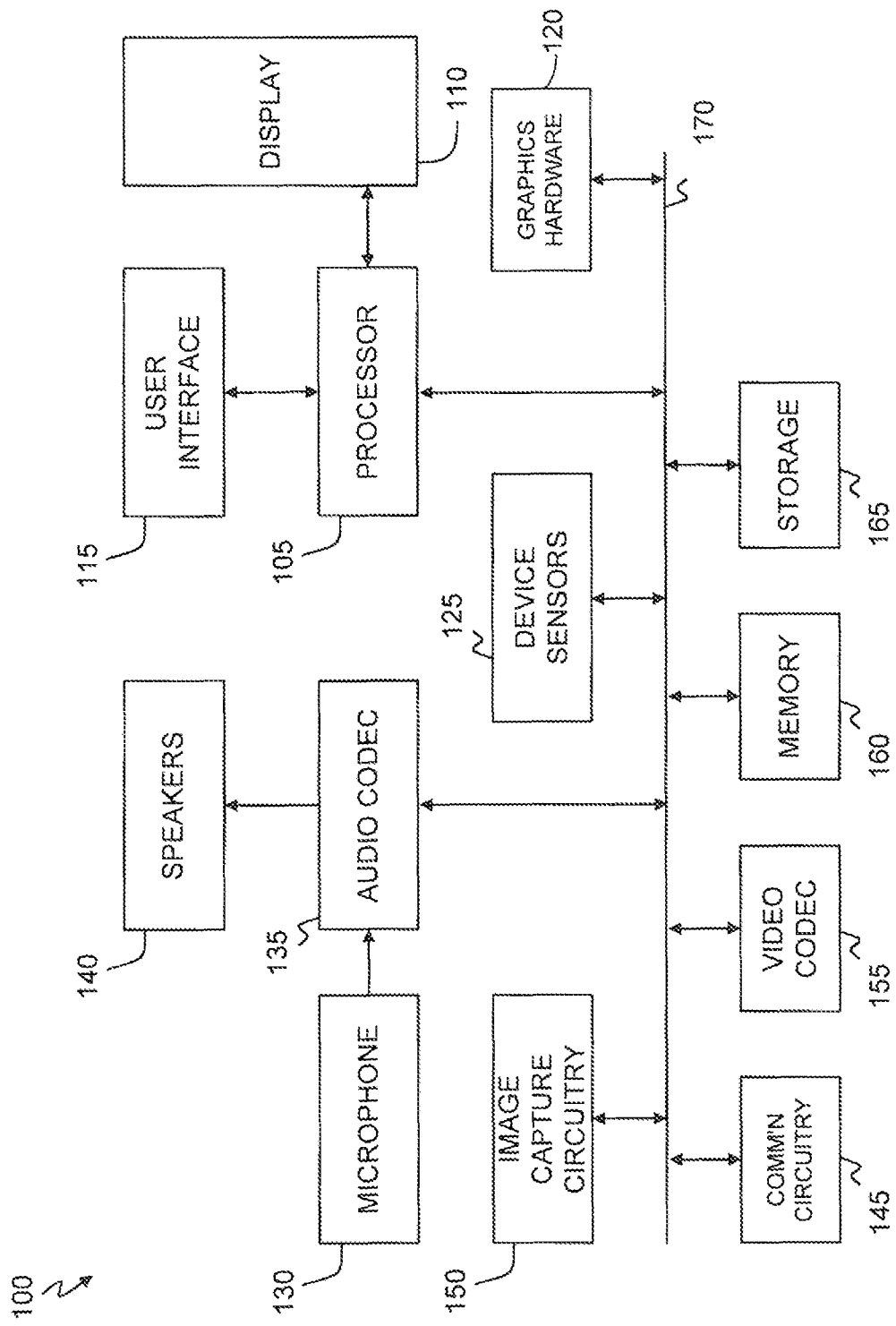
FIG. 1 is a block diagram of a processor-based device.

Referring to FIG. 1, a simplified functional block diagram of illustrative electronic device 100 is shown according to one embodiment. Electronic device 100 could, for example, be a smartphone, personal media device, portable camera, or a tablet, notebook or desktop computer system. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, image capture circuit or unit 150, video codec(s) 155, memory 160, storage 165, and communications bus 170.

Processor 105 may execute instructions necessary to carry out or control the operation of many functions performed by device 100 (e.g., such as the processing of data obtained from device sensors 125). Processor 105 may, for instance, drive display 110 and receive user input from user interface 115. User interface 115 can take a variety of forms, such as a button, keypad, dial, a click wheel, keyboard, display screen and/or a touch screen. Processor 105 may be a system-on-chip such as those found in mobile devices and include one or more dedicated graphics processing units (GPUs). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 perform computational tasks. In one embodiment, graphics hardware 120 may include one or more programmable graphics processing units (GPUs).

Image capture circuitry 150 may capture still and video images that may be processed to generate images. Output from image capture circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory Memory (EPROM), and Electrically Erasable Programmable Read-Only Memory (EEPROM). Memory 160 and storage 165 may be used to retain computer program instructions or code organized into one or more modules and written in any desired computer programming language. When executed by, for example, processor 105 such computer program code may implement one or more of the methods described herein. 160 may include one or more different types of media used by processor 105, graphics hardware 120, and image capture circuitry 150 to perform device functions. For example, memory 160 may include memory cache, read-only memory (ROM), and/or random access memory (RAM). Storage 165 may store media (e.g., audio, image and video files), computer program instructions or software, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only.

An electronic device such as device 100 may receive inputs from on-board device sensors 125 which sensors may be of the types described, above—i.e., proximity sensors, accelerometers, gyroscopes, ambient light sensors and location sensors. In addition, it may receive signals and/or data from remote sensors via communication circuitry 145. Such remote sensors may be worn by the user of the device—e.g., wrist motion sensors, pulse rate sensors, breathing rate sensors, and the like. It will be appreciated by those skilled in the art that processor 105 of system 100 may be programmed to receive input data from the sensors and deduce from that data the current activity of the user. The activity of the user may be used to automatically select one or more states (or "settings") of the device.

By way of example, consider a case wherein device 100 is a smartphone. For an extended period of time beginning at about 11:00 p.m. on a weekday (the day and time being available to processor 105 from the clock and calendar features of the phone and/or a network to which the phone is connected), the built-in accelerometers and gyroscopes report no movement of the device and the ambient light sensor reports dim or dark conditions. Remote sensors worn by the user report infrequent arm movement and depressed pulse and breathing rates. No keyboard or touchscreen inputs are made. No calls or messages are sent. The phone may sense that it is connected to a charger. From all this information, a process running on processor 105 may reasonably infer that the user is asleep. The process may assign a probability to this inference based on certain preselected parameters of the data. The processor may use the calculated probability in deciding what, if any, actions to take based on the information. For example, if the process determines with a certain, relatively high degree of probability that the user is asleep, the process may cause the smartphone to enter a Do Not Disturb state wherein alarms and notifications are suppressed. If the user has set a wake-up alarm, the process may automatically cause the device to exit the Do Not Disturb state in time for the alarm to sound.

The probability calculation may employ pattern recognition techniques. For example, if a certain determined user activity (e.g., sleeping) occurs repeatedly at about the same time in about the same place every day for about the same length of time, a higher probability (degree of confidence) may be assigned to that determination.

Various embodiments may best be understood by reference to the following examples and exemplary embodiment(s) illustrated in the drawing figures.

Example 1

The alarm clocks of the prior art (including those incorporated into smartphones) are typically manual input devices and are invasive in nature. An alarm clock (or alarm function) according to one embodiment may be set automatically based on the user's calendar events and/or daily routine which, as described above, may be determined from remote sensors worn by the user and/or on-board sensors in the phone.

In this example, the user of a smartphone stayed up very late on Friday night (until 4:00 a.m.) as determined from data received from a biometric bracelet worn by the user. It's now Saturday, and there are no entries for the day on the user's calendar. The user has a Reminder set for 10:00 a.m. to "call parents." The default (static) daily wake-up alarm is set for 9:00 a.m. and the default (static) daily setting for disabling the Do Not Disturb feature is also set for 9:00 a.m.

Based on the user's lack of sufficient sleep and no scheduled early appointments, the system may automatically re-set the wake-up alarm to a first later time (e.g., 9:45 a.m.) and extend the Do Not Disturb state to second later time (e.g., 10:00 a.m.) In this way, the user will be awakened in time for his scheduled call and given 15 minutes without interruption from the phone to arise, check messages, reminders, and the like.

Example 2

In this example, the user of a smartphone has set a daily (static) wake-up alarm at 9:00 a.m. and the default (static) daily setting for disabling the Do Not Disturb feature is also set for 9:00 a.m. However, there is a calendar entry for a meeting at 8:00 a.m. Sensor inputs indicate normal activity of the user.

Under these conditions, the process may automatically reset the alarm to a first earlier time (e.g., 7:00 a.m.) and reset the Do Not Disturb state to end at a second earlier time (e.g., 8:00 a.m.)

In this way, the system automatically resolves the conflict between the daily alarm setting and the scheduled meeting by awakening the user well in advance of the start time of the meeting.

Example 3

As discussed above, remote sensors worn by the user in a bracelet, chest strap, undergarment, etc. may be used by the system (smartphone) to determine when the user falls asleep and/or wakes up. This determination may be supplemented (or entirely made) by the performance of certain pre-defined tasks performed by the user on the device—e.g., turning on or off the Do Not Disturb feature. The determination may also be supplemented by activity monitoring on the device itself—e.g., being connected to or disconnected from a charger, docking station, or the like or being stationary in a recurring location (e.g., bedside) for an extended period of time.

In this example, suppose that the user is wearing a heart rate monitor in data communication with the smartphone via a BLUETOOTH® connection (Bluetooth Sig, Inc., Kirkland, Wash. 98033). Based on changes in the user's heart rate, the system determines that the user fell asleep at 10:55 p.m. The user's daily (static) settings will activate the Do Not Disturb feature at 11:30 p.m. However, based on the "fact" that the user has apparently fallen asleep somewhat ahead of schedule, the system may automatically activate the Do Not Disturb feature when the user falls asleep (10:55 p.m.).

Example 4

In a related example, the system may automatically perform certain functions when it detects that a user has awakened.

In a representative case, suppose that the user is wearing a heart rate monitor in data communication with a smartphone via a Bluetooth connection. Based on changes in the user's heart rate, the system determines that the user is awake at 8:00 a.m. The user's daily (static) settings deactivate the Do Not Disturb feature at 9:00 a.m. and the alarm is set for 9:00 a.m. Since the user is "up early," the system may immediately (at 8:00 a.m.) automatically deactivate the Do Not Disturb feature and deactivate the alarm for that day—since it is unnecessary inasmuch as the user is awake at 8:00 a.m. whereas the alarm is set for 9:00 a.m.

Example 5

In yet another embodiment of the invention, sensors (built-in or remote) may be used to determine when a user falls asleep and settings on the device (smartphone) may automatically be made by the system in response to the user's condition.

In a representative case, assume the user is wearing biometric and/or movement sensors that are in data communication with a smartphone via a Bluetooth connection. The user wishes to take a 30-minute "power nap" in the afternoon. The user inputs the desired nap duration (30 minutes) but no specific beginning or ending time.

Based on sensor readings, the system determines that the user fell asleep at 3:15 p.m. In response, the system may automatically set the Do Not Disturb feature to be active from 3:15 p.m. until 3:45 p.m. and automatically set the alarm to sound at 3:45 p.m.

Example 6

Figure 2:
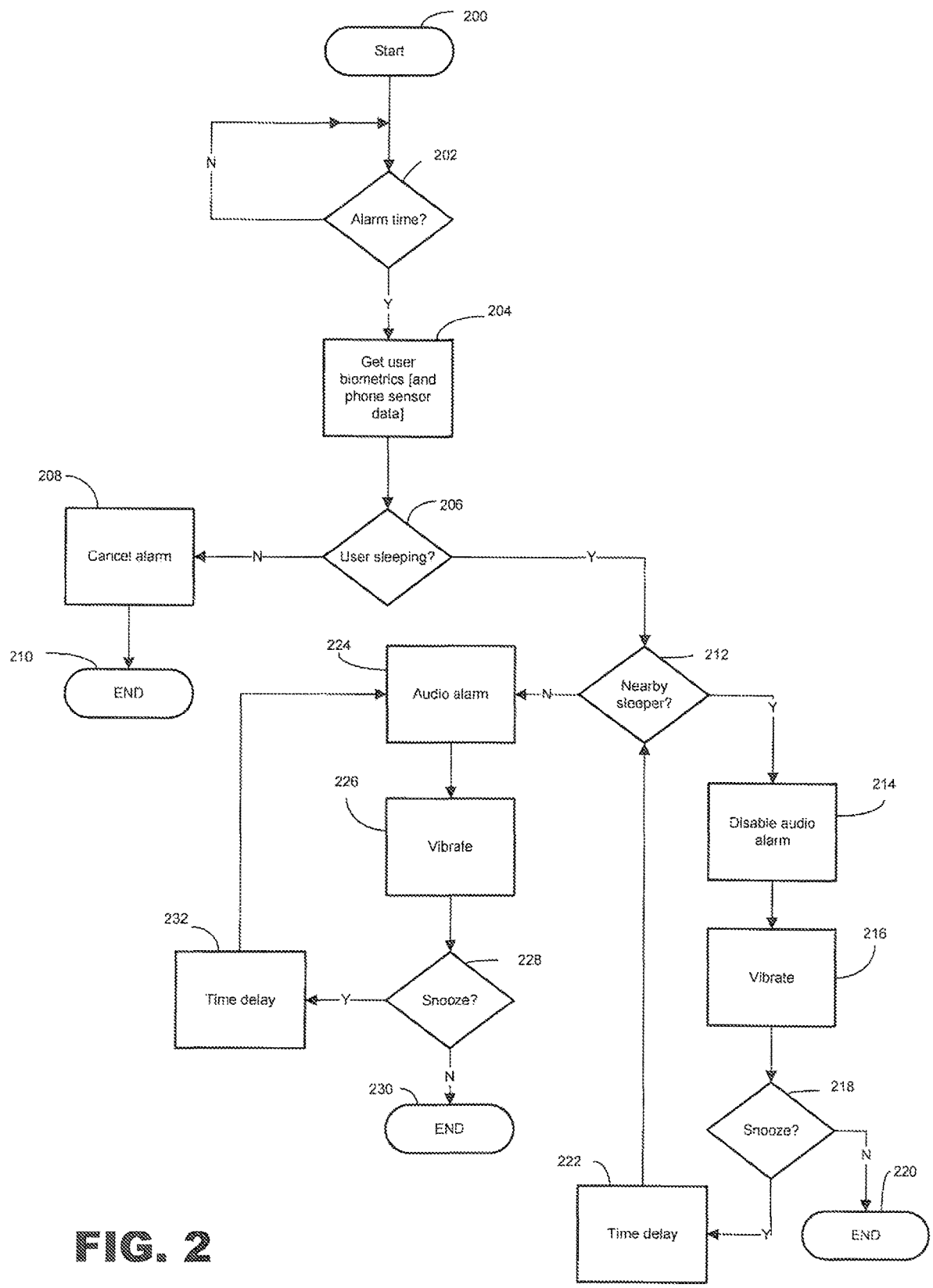
FIG. 2 is flowchart of a process according to one embodiment of the invention.

Referring now to FIG. 2, a process according to yet another embodiment is diagramed wherein a smartphone (or similar processor-based device) wakes a user by a method selected based upon whether another person is nearby and (possibly) sleeping.

For purposes of this example, assume that a smartphone user (a "first person") is wearing sensors responsive to his or her biometrics (motions and/or pulse rate, breathing rate, etc.) These sensors are in data communication with the smartphone (e.g., via a WLAN, personal area network, or the like). The user is also wearing an alert device—for example, a bracelet equipped with a vibrator. The alert device may be incorporated in a single device also containing the biometric sensors. Another person ("second person") is in the vicinity of the user and is also a smartphone user wearing one or more biometric sensors. The sensors worn by the second person are in data communication with the first person's smartphone. This data communication may be direct or via the second person's smartphone.

The process begins at 200 in FIG. 2. At decision diamond 202 the current time is compared to the alarm set time. If the alarm set time has not yet been reached, the process repeats (N branch at 202). If the current time is the alarm set time (Y branch at 202), the process continues to block 204 at which point the system may obtain data from remote sensors worn by the user and/or on-board sensors in the smartphone. At decision diamond 206, the sensor data (possibly in combination with other information such as time-of-day and/or user inputs) is used to determine whether the user is asleep. If the user is not sleeping (N branch at 206), the system may automatically cancel the alarm (at block 208) inasmuch as it is no longer required, and the process terminates at 210.

If, on the other hand, it is determined (with some pre-set probability threshold) that the user is sleeping (Y branch at 206), a determination is made (at 212) whether a second person in near proximity to the user is asleep. Proximity may be determined, for example, by the user's phone receiving radio signals from sensors worn by the second person or by location data sent by the second user's smartphone. If there is a nearby sleeper (Y branch at 212) the process may disable the audio alarm (speaker) on the user's device (smartphone) at block 214 and proceed to awaken the user with only the vibrator worn by the user (at 216). An optional "snooze" function may be implemented at 218 wherein the user may cause the alarm to deactivate but repeat after a pre-selected time delay (block 222). As shown in FIG. 2, after the expiration of the time delay, the system may make another (updated) determination (at 212) of whether there is a nearby sleeper, and the process repeated. In certain embodiments, the "snooze" function may be repeated only a limited number of times.

If, however, it is determined that there is no nearby sleeper (N branch at 212), the process may continue to block 224 where the audio alarm sounds and to block 226 where the vibrator worn by the user is activated. As described above, an optional "snooze" function may be implemented at 228 to insert at time delay (at 232) before repeating the alarms (at 224 and 226).

In this way, the system may automatically select the most appropriate way to awaken the user. Disturbing a sleeping bedmate with the audio alarm on a user's smartphone may be avoided by using only a vibrating device worn by the user to awaken him or her. However, when such measures are not needed, the system may automatically revert to conventional alarms, all without the need for user input.

In yet other embodiments, a smartphone (including the second person's smartphone) may advertise the sleep/awake status of its user for receipt by nearby compatible devices. The smartphone may use one or more of the methods described hereinabove to make the status determination. In certain embodiments, the probability associated with the determined status may also be transmitted.

Example 7

If a calendar-equipped device such as a smartphone has both audible and tactile notifications and/or alarms, another embodiment may be used to automatically disable the audible alarm(s) (or notification) and enable the tactile alarm(s) (or notification) during a scheduled meeting.

In an illustrative example, the system may check the user's calendar on a particular day and determine that a meeting is scheduled from 10:00 a.m. to 11:00 a.m. In response, the system may automatically disable any audible alarms (or notifications) and enable a tactile alarm (e.g., a vibrator) for that time interval. At the end of the period, the system may automatically restore the alarm modes that were in effect immediately before the start of the period. In certain embodiments, the system may notify the user of the change and offer an option of overriding the automatic disabling of audible alarms and/or notifications.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A computer-implemented method comprising:
receiving sensor data from at least one sensor responsive to an activity of a user;
determining, at a current time based on the sensor data, an estimated time when the user went to sleep;
identifying that a communication-suppression state of a device associated with the user will be activated at a default activation time, wherein the device does not present a visual or haptic stimulus in response to one or more types of trigger events when the communication-suppression state is activated;
determining that the default activation time is after the estimated time when the user went to sleep; and
based on the determination that the default activation time is after the estimated time when the user went to sleep, activating the communication-suppression state at a time earlier than the default activation time.

2. The method of claim 1, wherein the one or more types of trigger events include an alarm, a phone call or a text message.

3. The method of claim 1, wherein the device communicates with the at least one sensor through a wireless protocol, and wherein the at least one sensor includes a motion sensor, a pulse-rate sensor, or a breathing-rate sensor.

4. The method of claim 3, wherein the wireless protocol includes a Bluetooth wireless protocol.

5. The method of claim 1, wherein determining the estimated time when the user went to sleep is based on identifying a start of a time period associated with:
a lack of inertial movement sensed by an inertial-motion sensor;
dim or dark conditions sensed by an ambient light sensor; or
physiological data, as sensed by a physiological-data sensor, indicative of sleep.

6. The method of claim 1, wherein the time earlier than the default activation time is defined to be the same as the estimated time when the user went to sleep.

7. The method of claim 1, wherein the estimated time when the user went to sleep is further determined based on the device remaining stationary for a predetermined time period.

8. The method of claim 1, wherein the estimated time when the user went to sleep is further determined by detecting one or more operations being performed through the device.

9. The method of claim 1, wherein the estimated time when the user went to sleep is further determined by detecting a change associated with a charging state of the device.

10. The method according to claim 1, wherein the device is a smart device.

11. A system comprising:
one or more processors: and
a non-transitory computer-readable storage medium containing instructions which, when executed on one or more data processors, cause the one or more data processors to perform a set of actions including:
receiving sensor data from at least one sensor responsive to an activity of a user;
determining, at a current time based on the sensor data, an estimated time when the user went to sleep;
identifying that a communication-suppression state of a device associated with the user will be activated at a default activation time, wherein the device does not present a visual or haptic stimulus in response to one or more types of trigger events when the communication-suppression state is activated;
determining that the default activation time is after the estimated time when the user went to sleep; and based on the determination that the default activation time is after the estimated time when the user went to sleep, activating the communication-suppression state at a time earlier than the default activation time.

12. The system of claim 11, wherein the one or more types of trigger events include an alarm, a phone call or a text message.

13. The system of claim 11, wherein the device communicates with the at least one sensor through a wireless protocol, and wherein the at least one sensor includes a motion sensor, a pulse-rate sensor, or a breathing-rate sensor.

14. The system of claim 13, wherein the wireless protocol includes a Bluetooth wireless protocol.

15. The system of claim 11, wherein determining the estimated time when the user went to sleep is based on identifying a start of a time period associated with:
- a lack of inertial movement sensed by an inertial-motion sensor;
- dim or dark conditions sensed by an ambient light sensor; or
- physiological data, as sensed by a physiological-data sensor, indicative of sleep.

16. The system of claim 11, wherein the time earlier than the default activation time is defined to be the same as the estimated time when the user went to sleep.

17. A computer-program product tangibly embodied in a non-transitory machine-readable storage medium, including instructions configured to cause one or more data processors to perform a set of actions including:
- receiving sensor data from at least one sensor responsive to an activity of a user;
- determining, at a current time based on the sensor data, an estimated time when the user went to sleep;
- identifying that a communication-suppression state of a device associated with the user will be activated at a default activation time, wherein the device does not present a visual or haptic stimulus in response to one or more types of trigger events when the communication-suppression state is activated;
- determining that the default activation time is after the estimated time when the user went to sleep; and
- activating the communication-suppression state at a time earlier than the default activation time.

18. The computer-program product of claim 17, wherein the one or more types of trigger events include an alarm, a phone call or a text message.

19. The computer-program product of claim 17, wherein the device communicates with the at least one sensor through a wireless protocol, and wherein the at least one sensor includes a motion sensor, a pulse-rate sensor, or a breathing-rate sensor.

20. The computer-program product of claim 17, wherein the estimated time when the user went to sleep is further determined based on the device remaining stationary for a predetermined time period.

21. The computer-program product of claim 17, wherein the estimated time when the user went to sleep is further determined by detecting one or more operations being performed through the device.

* * * * *